United States Patent Office 2,754,322
Patented July 10, 1956

2,754,322

CATALYTIC DEHYDROCHLORINATION OF $\alpha,\beta$-DICHLOROPROPIONIC ACID COMPOUNDS Harry D. Anspon, Easton, Pa., assignor to General Aniline & Film Corporation, New York, N. Y., a corporation of Delaware No Drawing. Application January 21, 1953,
Serial No. 332,570

6 Claims. (Cl. 260—486)

This invention relates to an improvement in the preparation of $\alpha$-chloroacrylic acid compounds by dehydrochlorination of corresponding dichloropropionic acid compounds containing at least one chlorine in $\alpha$-position.

It was known heretofore to prepare $\alpha$-chloroacrylic acid esters by heating the corresponding dichloropropionic acid esters having at least one chlorine in $\alpha$-position with an alkaline hydrogen chloride acceptor such as alkali and alkaline earth metal hydroxides, carbonates or bicarbonates (U. S. Patent 2,245,547), and alkali, alkaline earth or ammonium salt of a carboxylic acid (U. S. Patent 2,476,528), especially of a polycarboxylic acid (U. S. Patent 2,673,875), or an alkali metal phosphate (U. S. Patent 2,640,073) in the presence of sufficient water to form a solution of the hydrogen chlorine acceptor. The reaction is ordinarily carried out under reflux at the boiling point of the aqueous portion of the mixture. The elevated temperatures employed tend to cause losses by decomposition, saponification or polymerization of the $\alpha$-chloroacrylic acid esters produced.

It is desirable therefore to accelerate the dehydrochlorination reaction in the aforesaid procedures, in order to reduce the time during which the starting material and the $\alpha$-chloroacrylic acid compound produced are subjected to elevated reaction temperatures.

In accordance with this invention, dehydrochlorination of dichloropropionic acid compounds of the class consisting of esters, amides, N-substituted amides and nitriles, in which one of the chlorine atoms is in $\alpha$-position, and especially compounds of $\alpha,\beta$-dichloropropionic acid, are converted to the corresponding $\alpha$-chloroacrylic acid compounds by reaction with the alkaline dehydrochlorinating agents of the type disclosed in the aforesaid references, and in the presence of sufficient water to dissolve at least partially the dehydrochlorinating agent, at a much more rapid rate by carrying out the reaction in the presence of catalytic amounts of a water-soluble iodide, especially an alkali or alkaline earth metal iodide. The improvement thus effected results in a substantial saving in the time required for the reaction, with corresponding increase in the capacity of equipment, as well as in a decrease in losses from side reactions and polymerization, and facilitates recovery of a pure product from the reaction mixture.

Catalytic amounts of water-soluble iodides, particularly of alkali and alkaline earth metals, range from 0.1 to 1% by weight of the total reaction mixture. Amounts in excess of the aforesaid range can be employed, but the excess iodide does not produce a corresponding increase in the rate of reaction.

Alkaline dehydrochlorinating agents employed in the process of this invention are those disclosed in the prior patents and applications mentioned above. They include hydroxides, carbonates, and bicarbonates of alkali or alkaline earth metals having sufficient water-solubility to form at least dilute aqueous solutions under the reaction conditions; alkali metal phosphates, especially the dibasic phosphates; and alkali and alkaline earth metal salts (including ammonium salts) of carboxylic acids, especially of polybasic carboxylic acids, which likewise have adequate water-solubility to form at least dilute aqueous solutions under the reaction conditions. The salts employed as dehydrochlorinating agents generally have a mild alkaline-to-neutral reaction, or even a weakly acid reaction in aqueous solution, but are salts of acids sufficiently weak to be readily liberated by the hydrogen chloride formed in the dehydrochlorination procedure. The amount of alkaline dheydrochlorinating reagent is preferably at least sufficient to neutralize all of the hydrogen chloride liberated in the conversion of the dichloropropionic acid compound to the corresponding $\alpha$-chloroacrylic acid compound. A small excess (e. g. up to 10% in excess of the theoretical amount) can also be used to advantage.

The amount of water employed can vary within wide limits, but is conveniently about 1 to 5 times the amount by weight of the dichloropropionic acid compound subjected to the reaction.

The dichloropropionic acid compounds which can be advantageously converted to corresponding $\alpha$-chloroacrylic acid compounds in accordance with this invention are the esters, amides, N-substituted amides and nitriles of $\alpha,\beta$-dichloropropionic acid as well as of $\alpha,\alpha$-dichloropropionic acid.

The reaction is effected by heating under reflux, generally at or near the boiling temperature of the aqueous portion of the reaction mixture (e. g. temperatures from 90° to 110° C.). When the reaction is complete, the organic portion of the reaction mixture can be separated from the aqueous portion thereof, and the $\alpha$-chloroacrylic acid compound recovered, e. g. by fractional distillation, or by other conventional means of separation from accompanying compounds. Separation of the organic portion of the reaction mixture from the aqueous portion thereof can be effected by decantation and washing, or by steam distillation if the reaction products are volatile with steam.

It is often advantageous to include a small amount of a polymerization inhibitor in the dehydrochlorination mixture to reduce the tendency of the $\alpha$-chloroacrylic acid compounds to polymerize.

Example 1

Two reaction mixtures were prepared having the following compositions:

| | |
|---|---|
| Adipic acid | 73.07 parts (0.5 mol.) |
| Sodium hydroxide | 40.0 parts (1.0 mol.) |
| Picric acid | 0.83 part. |
| Water | 166.0 parts. |
| Sodium iodide | 1.0 part. |
| Methyl $\alpha,\beta$ - Dichloropropionate | 78.5 parts (0.5 mol.) |

The mixtures were heated under flux to boiling temperature, respectively for 15 and 30 minutes. At the end of these periods, the mixtures were poured over cracked ice, and the resulting organic layer which separated from the aqueous layer was removed and analyzed for methyl $\alpha$-chloroacrylate and methyl $\alpha,\beta$-dichloropropionate.

As a control, two reaction mixtures were prepared from the same ingredients and in the same proportions given above, except that sodium iodide was omitted, and these were similarly refluxed for 15 and 30 minutes, respectively, and the organic portion of the reaction mixtures produced separated and analyzed.

The results of the analyses of the mixtures produced at the end of 15 minutes, indicated that the organic fraction contained the starting material and the α-chloroacrylate in the following proportions:

|  | Percent Methyl α,β Di-Chloropropionate | Percent Methyl α Chloroacrylate |
|---|---|---|
| Sodium Iodide Present | 45.9 | 52.6 |
| Sodium Iodide Absent | 60.8 | 40.4 |

Similarly, analysis of the mixtures obtained at the end of 30 minutes yielded the following comparative results:

|  | Percent Methyl α,β Di-Chloropropionate | Percent Methyl α Chloroacrylate |
|---|---|---|
| Sodium Iodide Present | 12.3 | 80.0 |
| Sodium Iodide Absent | 24.5 | 73.4 |

The substantially increased proportions of methyl α-chloroacrylate in the mixture containing sodium iodide, demonstrate that a substantial acceleration of the reaction was effected by its presence.

Recovery of methyl α-chloroacrylate was effected by fractional distillation of the organic portion of the reaction mixtures obtained.

*Example 2*

A reaction mixture was prepared having the following composition:

| Phosphoric acid (85% $H_3PO_4$) | 120.0 parts (1.04 mol.) |
| Sodium hydroxide | 80.0 parts (2.0 mols.) |
| Picric acid | 0.5 part |
| Water | 200.0 parts. |
| Sodium iodide | 2.0 parts. |
| Methyl α,β - dichloropropionate | 78.5 parts (0.5 mol.) |

As a control, a similar reaction mixture was prepared, except that sodium iodide was omitted. The two reaction mixtures were heated to boiling under reflux for 2 to 2½ hours, and then poured on crushed ice, and the organic portion of the reaction mixtures decanted and analyzed.

The results obtained were as follows:

|  | Percent Methyl α,β Di-Chloropropionate | Percent Methyl α Chloroacrylate |
|---|---|---|
| Sodium Iodide Present | 34.4 | 64.8 |
| Sodium Iodide Absent | 65.9 | 34.4 |

Substantial acceleration of the dehydrochlorination reaction by inclusion of sodium iodide is thereby demonstrated. As in Example 1, methyl α-chloroacrylate was recovered from the decanted organic portion of the reaction mixture of the invention by fractional distillation.

Similar results are obtained upon substituting potassium, magnesium, calcium, barium, or strontium iodides for sodium iodide. The proportion of iodide employed is at least 0.1% by weight of the entire reaction mixture, and preferably 0.1 to 1% thereof.

Instead of methyl α,β-dichloropropionate employed in the examples, other esters of α,β-dichloropropionic acid can be similarly dehydrochlorinated to form the corresponding α-chloroacrylic esters in the presence of sodium iodide, whereby similar acceleration of the reaction occurs. Such esters include, for example, the ethyl, isopropyl, butyl, amyl, isoamyl, n-hexyl, octyl, lauryl, and octadecyl esters of α,β-dichloropropionic acid; esters of the latter acid with unsaturated alcohols such as allyl, methallyl, crotyl, oleyl, and chloroallyl alcohols; polyhydric alcohol esters of α,β-dichloropropionic acid, such as those of glycol, glycerol, sorbitol, mannitol; and also aryl, aralkyl, cycloalkyl, and heterocyclic esters of α,β-dichloropropionic acid, such as phenyl, cresyl, resorcyl, benzyl, naphthyl, fenchyl, cyclohexyl, furfuryl, and tetrahydrofurfuryl esters. Similarly, the corresponding esters of α,α-dichloropropionic acid or of mixtures thereof with α,β-dichloropropionic acid can be used.

Similarly, instead of the esters of α,α- or α,β-dichloropropionic acid, the nitriles, amides and N-substituted amides can also be advantageously dehydrochlorinated in the presence of a water-soluble iodide by the procedure of Examples 1 and 2 to yield the corresponding derivatives of α-chloroacrylic acid. N-substituted amides include mono- and di-methylamides, the mono- and di-ethylamides, β-hydroxyethylamides; N-cyclohexyl- and N-cylclohexyl-N-methylamides, N-benzyl- and N-benzyl-N-methylamides; anilides, morpholides and piperidides. In each case, marked acceleration of dehydrochlorination is effected in the presence of sodium iodide.

Alkaline dehydrochlorinating agents employed are the aqueous alkaline reacting compunds mentioned in U. S. Patents 2,245,547 and 2,434,299, including water-soluble sodium, potassium, calcium, and magnesium hydroxides, carbonates, or bicarbonates; the ammonium, alkali and alkaline earth metal salts of carboxylic acids of U. S. Patent 2,476,528, including acetates, chloroacetates, lactates, benzoates, salicylates, oxalates, tartrates, malonates, maleates, fumarates, phthalates, naphthalates, as well as the adipates mentioned in copending application Serial No. 189,681 of October 11, 1950, now U. S. Patent 2,673,875, especially the polybasic salts of the polycarboxylic acids, and also the mono- to di-basic alkali metal phosphates of application Serial No. 194,018 of November 3, 1950, now U. S. Patent 2,640,073. The dehydrochlorinating agents are employed with water in sufficient amount to dissolve said agent partially, and are themselves employed in an amount at least sufficient to combine with all of the hydrogen chloride generated by dehydrochlorination of the dichloropropionic acid compound.

Inclusion of polymerization inhibitors such as picric acid employed in the examples, or tertiary butylphenol, or hydroquinone, is desirable to inhibit polymerization of the α-chloroacrylic acid compound produced.

The process can also be carried out in a continuous manner by continuously adding the dichloropropionic acid compound to an aqueous solution of the alkaline dehydrochlorinating agents, containing a water-soluble iodide, and continuously separating the reaction product (the corresponding α-chloroacrylic acid compound) from the reaction mixture, e. g. by distillation.

Other variations and modifications which will be obvious to those skilled in the art, can be made in the procedure hereinbefore described without departing from the spirit or scope of the invention.

I claim:

1. In a process for the preparation of α-chloroacrylic acid compounds by heating a member of the group consisting of the esters, amides, N-substituted amides and nitriles of dichloropropionic acids in which at least one of the chlorine atoms is in α-position, with an alkaline dehydrochlorinating agent in the presence of sufficient water to dissolve said agent partially, the improvement which consists in incorporating in the reaction mixture a catalytic amount of a water-soluble iodide.

2. A process as defined in claim 1 in which the amount of water-soluble iodide is 0.1 to 1% of the total weight of the reaction mixture.

3. A process as defined in claim 2, wherein the compound subjected to dehydrochlorination is an ester of $\alpha,\beta$-dichloropropionic acid.

4. A process as defined in claim 3, wherein the compound subjected to dehydrochlorination is methyl $\alpha,\beta$-dichloropropionate.

5. A process as defined in claim 3, wherein the alkaline dehydrochlorinating agent is the salt of a carboxylic acid.

6. A process as defined in claim 3, wherein the alkaline dehydrochlorinating agent is a mono- to di-basic phosphate.

References Cited in the file of this patent

UNITED STATES PATENTS 2,640,073   Ney _____ May 26, 1953

OTHER REFERENCES

Wagner: Synthetic Org. Chemistry, Wiley (1953), p. 36.

UNITED STATES PATENT OFFICE
CERTIFICATE OF CORRECTION

Patent No. 2,754,322                      July 10, 1956

Harry D. Anspon

It is hereby certified that error appears in the printed specification of the above numbered patent requiring correction and that the said Letters Patent should read as corrected below.

Column 1, lines 40 and 41, strike out "dehydrochlorination of"; column 2, line 15, for "dheydrochlorinating" read -- dehydrochlorinating --; column 3, line 11, for "Methy-" read -- Methyl- --.

Signed and sealed this 4th day of April 1961.

(SEAL)
Attest: ERNEST W. SWIDER
Attesting Officer

ARTHUR W. CROCKER
Acting Commissioner of Patents